July 19, 1966 P. H. McCORMACK 3,261,720
THERMOELECTRIC GENERATOR AND METHOD OF PREPARING SAME
Filed Oct. 11, 1961 2 Sheets-Sheet 1

INVENTOR.
PAUL H. McCORMACK
BY James & Franklin
ATTORNEYS

THERMOELECTRIC GENERATOR AND METHOD OF PREPARING SAME

Filed Oct. 11, 1961 2 Sheets-Sheet 2

INVENTOR.
PAUL H. McCORMACK
BY [signature]
ATTORNEYS

United States Patent Office 3,261,720
Patented July 19, 1966

3,261,720
THERMOELECTRIC GENERATOR AND METHOD OF PREPARING SAME

Paul H. McCormack, Metuchen, N.J., assignor to National Starch and Chemical Corporation, New York, N.Y., a corporation of Delaware
Filed Oct. 11, 1961, Ser. No. 144,396
9 Claims. (Cl. 136—205)

This invention relates to a method for the preparation of thermoelectric generators as well as to the generators thereby produced.

It is the prime object of this invention to provide long lasting thermoelectric generators which are capable of producing a substantial electromotive force (E.M.F.) while operating at a high rate of efficiency. It is a further object of this invention to prepare such thermoelectric generators in a form wherein they occupy very little volume in relation to their electrical output. Various other objects and advantages of this invention will be apparent from the discussion hereinafter disclosed.

It has long been known that the junction of two dissimilar metals will, on heating or cooling, produce an exchange of free electrons from one metal to the other. This exchange of electrons constitutes an electromotive force and represents a phenomenon known as the Seebeck Effect.

Because the potential difference which can be produced by a single junction of dissimilar metals is rather small, the actual utilization of this phenomenon has been for the most part limited to thermocouples and other comparable temperature sensing mechanisms as well as to heat sensitive safety devices such as fail-safe furnace switches. Another interesting application has involved large groups of thermocouples operating at very high temperatures such as that generated by sub-critical atomic reactors. Such units have displayed the ability to produce a considerable E.M.F.; however, they have a high weight to power ratio, require an expensive heat source and suffer from the inherent hazards of atomic radiation.

Efforts to produce useful quantities of electric power by means of the Seebeck Effect have heretofore been curtailed as a result of the various mechanical problems involved in the attempts to successfully construct operating units having the necessarily large number of dissimilar metal junctions. The major drawback, to date, has been the inability to position the required number of such junctions within a reasonably small volume. Various attempts to overcome this problem have, of course, been made. One approach involved the bundling together of large numbers of series-connected wire junctions. Other techniques necessitated the formation of bi-metallic junctions by means of intricate folding operations. For example, a plurality of alternate wires or bars of dissimilar metals were joined in continuous zig-zag form and then folded through the center line in order to bring all the junctions into close juxtaposition when the unit was bent into cylindrical form.

The combining of metal tapes and films has also been explored. Thus, for a sensitive measurement of temperature, usually from distant sources, thermocouples have been constructed from thin vacuum deposited films so as to reduce the heat capacity of the resulting thermojunction. Another more recent method for the generation of power by thermoelectric methods has involved the close positioning of metallic units together with similar units of an alloy of the metal; these units being in a face-to-face relationship similar to a mass of building blocks. When such a construction is heated or is used to contain a heat source, power is produced. In general, however, all of these devices were expensive to prepare, displayed very poor efficiency particularly at low temperatures, and were moreover capable of generating only negligible E.M.F.'s.

I have now discovered a method for preparing thermoelectric generators, said method resulting in the production of generators which for the first time are capable of providing sustained, practical quantities of electrical energy at a surprisingly high rate of efficiency. Furthermore, the thermoelectric generators prepared by means of the process of my invention are unique in their ability to successfully provide more than adequate space for a virtually unlimited number of bi-metallic junctions.

In brief, the process of my invention involves the preparation of thermoelectric generators comprising two dielectric surfaces which may be on the same or on separate substrates and which have a vacuum deposited discontinuous, particulate layer or film of dissimilar metals deposited upon their respective surfaces. These dissimilar particulate metal surfaces are then placed into intimate contact with each other so as to achieve particle-to-particle contact between the dissimilar metals with provision being made for wires or other means for drawing current from opposite ends of the resulting laminate.

By employing this technique of contacting two dielectric surfaces each having a vacuum deposited, discontinuous, particulate layer of dissimilar metals, it is possible to establish a vast number of bi-metallic junctions. It is this factor which provides the thermoelectric generators of the present invention with their unusually high E.M.F. values along with their outstanding degree of efficiency in composite units whose dimensions, as will be seen, are exceedingly small. Thus, for example, the use of the vacuum deposition techniques hereinafter described makes it possible to have as many as 10,000 discrete metallic particles per square centimeter of each surface. Therefore, even if a layer of such particles is only one particle in width, then for each centimeter of single width there will be 100 bi-metallic junctions.

With the generators of my invention the voltage developed will be a function of the number of particle-to-particle contacts, the order of contact (i.e. similar to dissimilar particles), and the sequence of ordered contacts per degree centigrade.

The operating range of my thermoelectric generators is limited only by the melting points of the metals, their thermoelectric response in relation to temperature, and the thermal stability of the dielectric surfaces which are used in their construction. They are thus adaptable to nearly all of the environmental conditions which may be encountered with either industrial or military applications.

The total power output of these devices is directly dependent upon the magnitude of the temperature differential which is established between opposite ends or surfaces or, in some modifications, between the core and the outer surface of the assembly. Provided that a significant temperature differential is maintained, the devices of my invention will continue to function at a high degree of efficiency. Care must also be taken to prevent any chemical and/or electrolytic action from corroding or otherwise affecting the particulate metal layers of these devices. This may be readily accomplished by excluding any contact with either oxygen or water. In order to achieve such protection, my devices may be operated in a vacuum or they may be potted or encapsulated in a suitable plastic, glass or ceramic medium.

The preferred dielectric surfaces for use in the process of my invention comprise flexible films of the type derived from synthetic, high polymer resins. An important prerequisite of such films, in addition to their dielectric nature, should be their ability to be easily destaticized and, more especially, to be readily degassed; that is, to be rid of any extraneous, volatile contaminants which might interfere with the vacuum metalizing process wherein a discontinuous, particulate layer of metal must be applied to these dielectric films. Degassing may be accompanied by exposing the film substrate to an electrostatic field or by subjecting it to a high vacuum immediately prior to the metalization operation. As will be seen, the use of flexible films for the dielectric surfaces or substrates of my thermoelectric generators allows for a great deal of versatility with respect to the manner in which these devices may be constructed as well as with respect to the ultimate applications for which they may be utilized. Representative of the various high polymer or plastic films which are applicable for use in my process are those derived from polyethylene, polypropylene, polyethylene terephthalate, polyvinyl fluoride, polytetrafluoroethylene, polychlorotrifluoroethylene, polyvinylidene chloride, polyvinyl chloride, polystyrene, cellulose acetate, and ethyl cellulose.

While the above discussion has been directed towards the use of flexible films which are, of course, highly desirable in the devices of my invention from the standpoint of their low cost and ease of handling, it should be noted that rigid, high temperature resistant dielectrics such as phenolic, polyester, silicone and ceramic sheets and laminations, either filled or unfilled, may also be used. In addition various other dielectric substances which may be either natural products, such as mica, or artifically derived, such as glass, may also be utilized. Such rigid supporting surfaces may be in either plane or formed configurations. Thus, although the subsequent discussion will relate essentially to the use of flexible plastic films, it is to be understood that the use of rigid dielectrics are well within the scope of my invention.

As for the metals which may be employed in my process, these should, ideally, have a very low electrical resistance and good thermoelectric properties. In addition, they must, of necessity, be capable of undergoing vacuum metalization. That is, they must be able, when heated in a vacuum, as by high frequency induction or by resistance heating, to either melt or sublimate so as to produce a metallic vapor which may then be deposited upon a dielectric substrate present with the vacuum chamber. Among the various metals which can be used, one may list, for example, copper, nickel, platinum, mixed alloys of chromium, gold, silver, antimony, aluminum, bismuth, magnesium, palladium, silicon, and zinc.

There are several techniques which may be used for the vacuum deposition, upon the surface of a dielectric substrate, of discontinuous particulate layers of any of the above described metals. The method which is most conveniently utilized involves an adjustment of the distance of the dielectric substrate from the source of the metallic vapor as well as an adjustment of the angle at which the substrate is inclined towards said vapor source with the object of positioning the substrate at a point near the limit of the mean free path which is assumed by the volatilized metal atoms. This method gives excellent results and can be readily mastered. Other procedures for achieving discontinuous, particular layers call for the use of film substrates which have been incompletely degassed as well as for the interposition of a perforated screen or grid between the film and the metal vapor source so as to focus the metallic emission and thereby insure its regularity. Ideally the individual metallic particles of my discontinuous, particulate layers should have a diameter which is equal to the distance between each of said particles. I have found that optimum results are achieved when these metallic particles have a diameter ranging from 10 to 50 microns in size.

In order to test the metallic layers for the purpose of determining that they are truly particulate and discontinuous, it is convenient to employ a conductance testing apparatus consisting of two probes connected to a galvanometer. Either one of these probes is fixed to one point on the surface of the film and the other probe is then passed or scanned over the film's surface. In the case of a continuous, non-particulate film, there will be a deflection of the galvanometer needle as the probe is scanned over the film's surface. However, where the film is properly discontinuous and particulate in nature, there will not be any deflection of the galvanometer needle.

The uniformity of particle deposition of the dissimilar metals is easily determined by comparing the relative light transmission of each of the resulting particulate metal layers. Thus, equal light transmission indicates equal particle-particle separation.

My invention will now be described in further detail with reference to the accompanying drawing, in which:

FIGS. 1 to 4 are greatly enlarged sectional views illustrating the steps in the preparation of one modification of my improved thermoelectric generators of which FIG. 4 is a view of the completed thermoelectric unit;

FIGS. 5 to 7 are greatly enlarged sectional views illustrating the steps in the preparation of another modification of my improved thermoelectric generators of which FIG. 7 is a perspective view of the completed unit.

In all the figures of the drawings, the metallic particles are shown in much greater enlargement than the remainder of the components.

Figure 1:
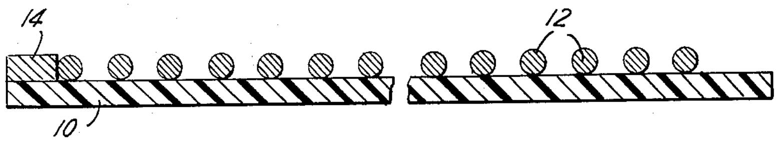

Referring now to FIGS. 1 to 4 of the drawing, FIG. 1 shows a flexible dielectric film substrate 10 having adherently deposited thereon a layer consisting of discrete, discontinuous particles 12 of a suitable thermoelectric metal, a metallic lead 14 used to establish contact between the thermoelectric unit and an external circuit being attached to one end of the substrae.

Figure 2:
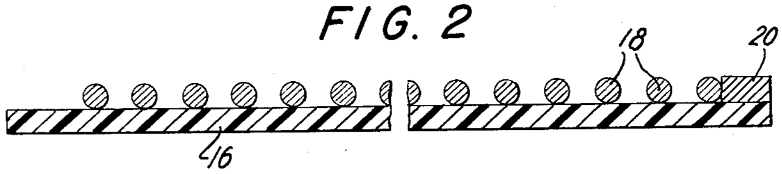

FIG. 2 shows another flexible dielectric film substrate 16 having adherently deposited thereon a layer consisting of discrete, discontinuous particles 18 of a suitable thermoelectric metal, said metal being dissimilar from the metal of the particles 12 shown in FIG. 1, a metallic lead 20 comparable to lead 14 of FIG. 1, and similarly attached, being used to establish contact between the thermoelectric unit and an external circuit. It is to be noted that these metallic leads should also, preferably, be made from dissimilar metals. However, it is not necessary that they be made of the same metals as are used to coat the dielectric substrates.

Figure 3:
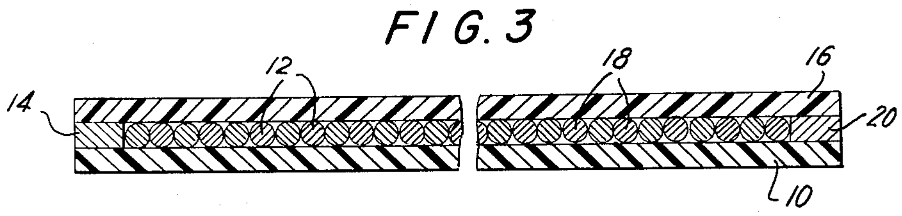

FIG. 3 shows a laminate combination of the elements of FIGS. 1 and 2 as they are brought into intimate contact with each other.

Figure 4:
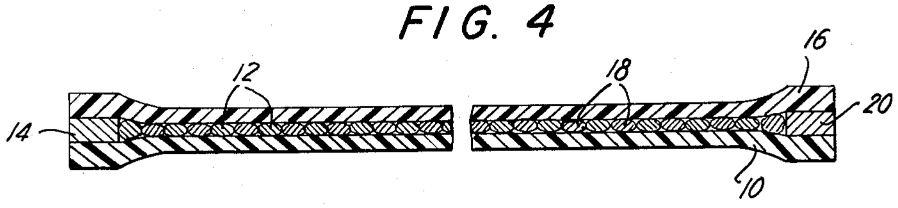

FIG. 4 shows the now completed unit wherein the laminate of FIG. 3 has been mechanically swaged or pressed together (with their edges sealed) so as to achieve a more complete degree of intimate particle-to-particle contact between the dissimilar metal particles 12 and 18.

Figure 5:
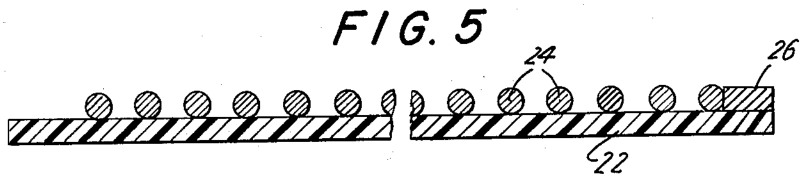

In another modification illustrative of the thermoelectric generators of my invention, the dissimilar metals are adherently deposited on the opposing surfaces of the same dielectric film substrate with contact between the dissimilar metallic particles being achieved by rolling or convolutely winding the thus coated substrate about a central conductive core. FIG. 5 shows a flexible dielectric film substrate 22 having adherently deposited thereon a layer consisting of discrete, discontinuous particles 24 of a suitable thermoelectric metal, 26 being a metallic lead which is used to establish contact between the thermoelectric unit and an external circuit.

Figure 6:
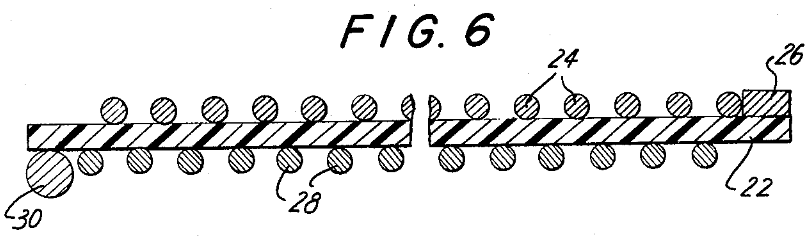

FIG. 6 shows the structure of FIG. 5 which is now coated on its opposite surface with a layer consisting of discrete, discontinuous particles 28 of a suitable thermoelectric metal, said metal being dissimilar from the metal 24, 30 being an added conductive core. It is to be noted that the metallic lead 26 and the conductive core 30 should also, preferably, be made from dissimilar metals. However, it is not necessary that they be made of the same metals as are used to coat the dielectric substrates.

Figure 7:
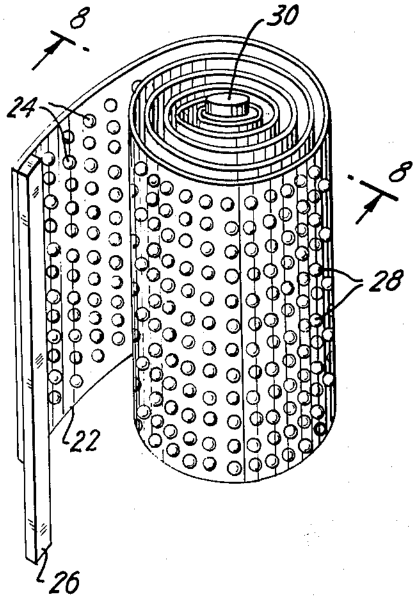
Figure 8:
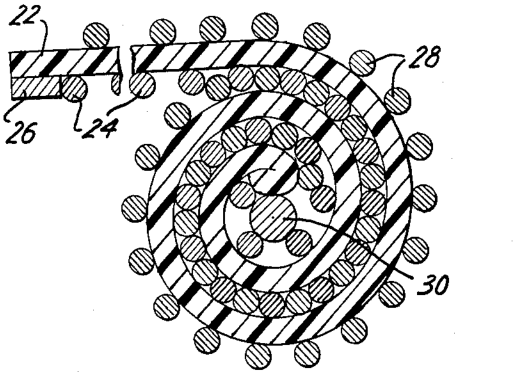
FIG. 8 is a view, partial and in enlargement, of FIG. 7, taken in cross-section along the line 8—8 of FIG. 7.

FIG. 7 shows the completed unit of FIG. 6, wherein the dielectric film substrate 22 having layers consisting of discrete, discontinuous particles 24 and 28 of dissimilar metal adherently deposited upon opposing surfaces of the substrate, convolutely wound about the conductive core 30 which latter thereby serves as a mandrel. FIG. 8 illustrates the manner in which the particles of the dissimilar metals 24 and 28 position themselves in particle-to-particle arrangement in the convolutely wound assembly.

It will be apparent that the two constructions shown in FIGS. 4 and 7 represent only two of the many modifications which can be assumed by the thermoelectric devices of my invention. These devices may be prepared in a variety of compact designs which will allow the choice of that form which is best suited for a particular end use application. However, it will be found that the basic principle of my invention which, in essence, involves the generation of electricity as a result of the E.M.F. produced by achieving intimate contact between minute, discontinuous particles of dissimilar metals, will in all cases result in thermoelectric generators which yield substantial E.M.F.'s at a high rate of efficiency.

The following example will further illustrate the principles and a specific embodiment of my invention:

A 5" x 7" sheet of 1.0 mil thick cellulose acetate film was first electrostatically degassed. It was then placed in a vacuum chamber and positioned at an angle of 7° and at a distance of 10 inches from the small crucible containing a 0.1 gram portion of high purity gold and the chamber was then evacuated down to a pressure of 0.5 micron Hg. Upon being heated to incandescence by means of an electrical resistance heater, the gold vaporized and the film sample was exposed to the resulting metallic vapor for a period of 10 seconds. Upon being tested by means of the aforedescribed conductance technique, it was found that the resulting gold coating on the film consisted of discrete, discontinuous particles. Microscopic examination revealed that these particles had an approximate diameter which averaged 30 microns.

In a repetition of the above described procedure, a comparable sheet of cellulose acetate was given a discontinuous, particle discrete, coating of silver.

Each of these sheets was then cut into 2 mm. x 8 mm. sections, and a section of the gold coated film was thereupon mechanically swaged or pressed into intimate contact with a section of the silver coated film. Electrical contact between the two sections was established by the insertion within the laminate, prior to the swaging operation, of two copper foil leads; one such lead having been placed at each longitudinal extremity of the film laminate.

A temperature gradient was then induced by placing the unit on top of a ⅛" aluminum plate which was resting on a cake of solid carbon dioxide. Upon being connected to a galvanometer, it was found that the above described assembly produced 1.0 microvolts per degree centigrade, and was capable of functioning through a range of from −10 to 25° C. The theoretical yield of a single thermoelectric junction comprising gold and silver is known to be 0.06 microvolt per degree centigrade. Thus, the above described device of my invention was found to have a net gain of 18 times over the theoretical value.

Summarizing, my invention is thus seen to provide novel thermoelectric generators capable of providing useful quantities of power at a high rate of efficiency.

In addition to serving as thermoelectric generators or batteries, the devices of my invention may also be utilized in a variety of other applications, such as:

(1) As a direct rectifier for converting alternating current into interrupted direct currrent by utilizing the heat generated by an alternating current passing through a resistance.

(2) For efficiently converting solar radiation into direct current; a number of the devices of my invention may be placed inside the focus of a solar mirror so as to overcome the problem of high temperature degradation which normally occurs when most materials are situated at a solar focus.

(3) By taking advantage of the Peltier Effect, the passage of a direct current E.M.F. through one of my devices would make it possible to achieve spot cooling of limited surface areas or of entire three dimensional forms.

(4) An additional elaboration upon the cooling system described in #3, above, would involve the preparation of large area cooling surfaces by placing two of the thermoelectric devices of my invention, in the form of large flat sheets, into the glue line of a plywood or similar panel. Such panels would provide for homes whose wall panels would have built in heating and cooling elements.

The method of making thermoelectric generators of the present invention, the structure, functioning and physical characteristics thereof and the uses and potential uses thereof will, it is believed be fully apparent from the above detailed description. It will be further apparent that many changes may be made in the method and the resulting product without departing from the spirit of the invention defined in the following claims.

I claim:

1. A thermoelectric generator comprising a member having two dielectric surfaces, each of which surfaces has a coating of a discontinuous, particulate layer of a metal, the metal particles on one surface being dissimilar in composition to the metal particles on the other surface, the dielectric surfaces of said member being in laminated relation with each other over substantially their entire areas with the metal particles on one surface in particle-to-particle contact with the metal particles on the other surface, said member having means electrically connected to said metal coatings at the opposite ends of said member for establishing contact with an external circuit.

2. The thermoelectric generator of claim 1, in which said member comprises separate substrates, one of said surfaces being on one substrate and the other of said surfaces being on the other substrate.

3. The thermoelectric generator of claim 1, in which said member comprises a unitary substrate, the said two surfaces being on opposite sides of said substrate.

4. The thermoelectric generator of claim 1, in which the said member comprises a flexible, plastic film.

5. The thermoelectric generator of claim 1, in which said member comprises a rigid base.

6. The method of preparing a thermoelectric generator which comprises coating each of two dielectric surfaces with a discontinuous, particulate layer of a metal, the metal particles on one surface being dissimilar in composition to the metal particles on the other surface, and then bringing into laminated relation the thus coated two dielectric surfaces over substantially their entire areas with the metal particles on one surface being brought into particle-to-particle contact with the metal particles on the other surface.

7. The method of claim 6, in which the discontinuous, particulate layers of metal on said dielectric surfaces are coated by the step of vacuum metal vaporization and deposition.

8. The method of claim 6, in which the two dielectric surfaces are on separate substrates.

9. The method of claim 6, in which the two dielectric surfaces are on opposite sides of the same substrate.

References Cited by the Examiner

UNITED STATES PATENTS

| | | | |
|---|---|---|---|
| 2,408,383 | 10/1946 | Evans | 136—5.22 X |
| 2,519,785 | 8/1950 | Okolicsanyi. | |
| 2,629,757 | 2/1953 | McKay | 136—5.2 |
| 3,103,741 | 9/1963 | Stoechkert | 29—472.5 |

WINSTON A. DOUGLAS, *Primary Examiner.*

JOSEPH REBOLD, *Examiner.*

D. L. WALTON, A. B. CURTIS, *Assistant Examiners.*